(No Model.)

J. H. HOWARD.
COOKING STEAMER.

No. 468,952. Patented Feb. 16, 1892.

Witnesses:
Aug. Mayer
J. W. Robards

Inventor:
John H Howard

UNITED STATES PATENT OFFICE.

JOHN H. HOWARD, OF PASADENA, CALIFORNIA.

COOKING-STEAMER.

SPECIFICATION forming part of Letters Patent No. 468,952, dated February 16, 1892.

Application filed June 22, 1891. Serial No. 397,171. (No model.)

*To all whom it may concern:*

Be it known that I, JOHN H. HOWARD, a citizen of the United States, residing at Pasadena, in the county of Los Angeles, State of California, have invented a new and useful Cooking-Steamer, of which the following is a specification.

My invention relates to improvements in cooking-steamers in which steam is used to cook eatables, the steam being generated from water placed in the bottom or the lowest compartment of the vessel.

The object of my improvement is, first, to economize heat; second, to simplify and thereby cheapen the vessel; third, to improve the convenience of the apparatus; fourth, to combine boiler and steamer without increasing the size and complicating the cooking apparatus; fifth, to provide means for the thorough drainage of boiled eatables without taking them out of the vessel and without the use of further kitchen utensils. I attain these objects by the mechanism illustrated in the accompanying drawings, in which—

Figure 1:
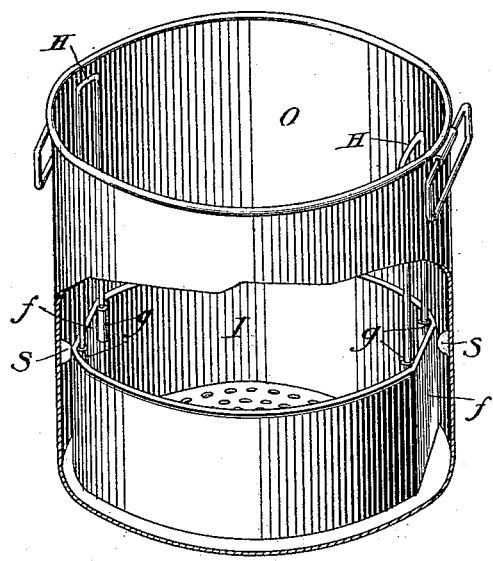
Figure 2:
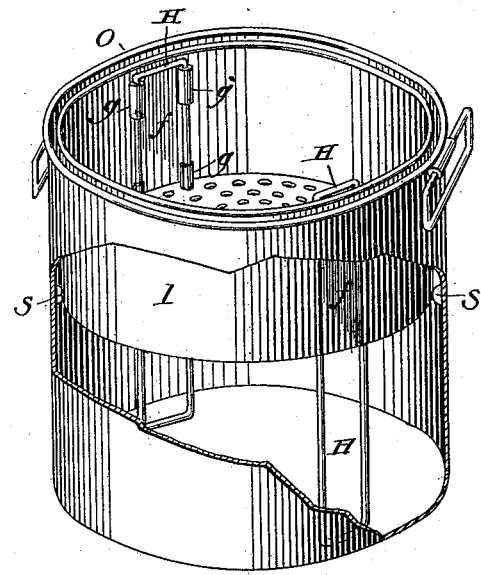
Figure 3:
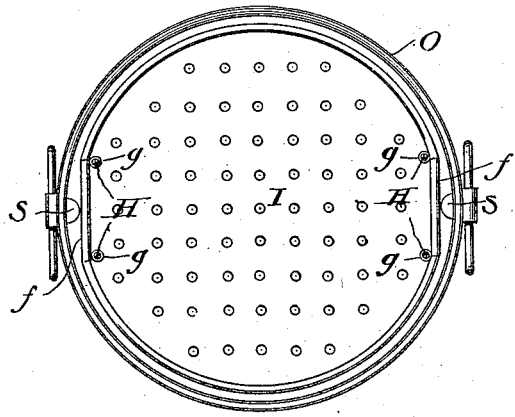
Figure 4:
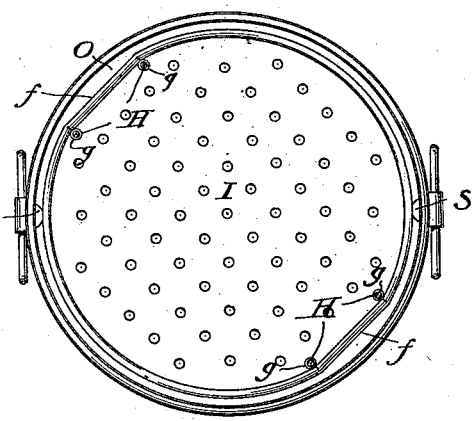

Figure 1 represents a perspective view of the entire apparatus, the top only being omitted, part of the front side of the wall of the outer vessel being shown as cut away in order to exhibit the interior and the inner vessel. The latter is shown to rest with its edge on the bottom of the outer vessel, the bottom of the inner vessel being made convex, so as to prevent the eatables from coming in contact with the bottom of the lower vessel, which is apt to scorch or burn them. Fig. 2 is the same perspective view as Fig. 1, showing, however, the inner vessel in the upper half of the outer vessel. Fig. 3 is a top view of Fig. 1, showing the shape of the vessel in plan, particularly that of the inner one, and the latter's position in regard to the supports or lugs S S when that is lowered to the bottom of the outer or larger vessel. Fig. 4 represents a top view of Fig. 2, showing the shape of the inner vessel and its position and the position of the flat walls *f f* in regard to the supports S S when the inner vessel is located in the upper half of the outer vessel.

Similar letters refer to similar parts throughout the several views.

In all views the top of the vessel has been omitted.

About midway from top to bottom the outer or larger vessel O is provided with two small projections S S, called "supporters." They are located diametrically opposite each other. The inner or smaller vessel I has the same form as the outer vessel, with the exception that it is provided with two flat perpendicular surfaces *f f*, diametrically opposite each other, so that the diameter of the vessel from one flat surface to the other is less than the diameter of the vessel wherever it is bound by the circular wall. Of course it is understood that the difference in diameter can be brought about by several other shapes of the vessels. The inner vessel, for instance, might be made elliptical (when viewed from the top) and the outer circular, or the inner one circular and the outer one elliptical. The shapes shown in my views are only those which I consider preferable, as they give the most available space for cooking purposes. The purpose of the flat surfaces (or the flattening of the inner or outer vessel) is to reduce its diameter for a short distance sufficiently to admit the easy lowering and raising of the inner vessel between the projections or supporters of the outer vessel into or out of the lower part of the latter. The inner vessel I is further provided with sliding handles H H, which are about twice the length of the depth of the inner vessel, or somewhat less than the depth of the outer vessel. These sliding handles are best located on the inner side of the perpendicular flat parts of the inner vessel. They are held in position by guides *g*. They are made movable, in order to allow their sliding down into the lower portion of the outer vessel when the inner vessel is raised and placed upon the supporters S S and used either as a steamer merely or as a strainer. They will therefore not interfere with the cover of the vessel when the inner vessel is placed upon the supporters. The bottom of the inner vessel is further provided with numerous small perforations. Their office is to admit steam or water from the lower part of the outer vessel, and, further, to afford drainage of the eatables (boiled in the inner vessel at the bottom of the outer) when the inner vessel is raised out of the water of the outer vessel and made to rest with its bottom upon the supporters S S.

A further feature of the apparatus is the free space allowed between the inner and outer vessel in all positions which will admit the steam surrounding the inner vessel completely and therefore prevent the outer air from cooling the walls of the inner vessel, thus facilitating the cooking of the eatables placed into the inner vessel. The loss of heat is thereby reduced to its minimum. In order, then, to drain eatables boiled in the inner vessel in the lower part of the outer vessel, the inner vessel is raised from the lower part of the outer vessel slightly above the supporters S S and turned around until the flatened surfaces $f\,f$ have passed the supporters S S, when the raised vessel is allowed to rest upon the supporters S S, its diameter from support to support being greater than the distance in the clear between the supporters S S. After having been raised to this position the handles of the inner vessel are allowed to slide down into the lower part of the outer vessel, and the cover may be put on to keep the eatables hot or to complete their cooking by steam. Of course the boiling and steaming of eatables may be carried on at the same time in the lower and upper parts of the apparatus.

Now, having described my invention, what I claim, and desire to secure by Letters Patent, is—

In a cooking-vessel, the combination of an outer and an inner vessel, the latter possessing a lesser depth than the former and both so constructed as to permit the lowering and raising of the inner vessel to and from the lower part of the outer vessel between projections of the latter and upon which projections the inner vessel may be placed without interfering with the covering of the vessel by a top, the perforated bottom and the sliding handles of the inner vessel, and the projections S S of the outer vessel.

JOHN H. HOWARD.

Witnesses:
AUG. MAYER,
L. C. WINSTON.